United States Patent [19]

Le-Khac

[11] Patent Number: 4,493,920

[45] Date of Patent: Jan. 15, 1985

[54] POLYMER COMPOSITIONS

[75] Inventor: Bi Le-Khac, Westchester, Pa.

[73] Assignee: Atlantic Richfield Company, Los Angeles, Calif.

[21] Appl. No.: 566,064

[22] Filed: Dec. 27, 1983

[51] Int. Cl.³ ............................ C08L 51/08; C08L 69/00
[52] U.S. Cl. ............................................ 525/67; 525/148
[58] Field of Search ........................... 525/148, 67, 468

[56] References Cited

U.S. PATENT DOCUMENTS

| | | | |
|---|---|---|---|
| 3,966,842 | 6/1976 | Ludwig et al. | 525/148 |
| 4,160,792 | 7/1979 | Fava | 525/148 |
| 4,351,920 | 9/1982 | Ariga et al. | 525/67 |
| 4,410,662 | 10/1983 | Witman et al. | 525/148 |

*Primary Examiner*—Theodore E. Pertilla
*Attorney, Agent, or Firm*—Dennis M. Kozak

[57] ABSTRACT

A polymer composition comprising a thermoplastic polycarbonate and a terpolymer of recurring units of a monovinyl aromatic monomer recurring units of a maleimide monomer and recurring units of an $\alpha, \beta$ ethylenically unsaturated cyclic anhydride monomer is disclosed.

22 Claims, No Drawings

POLYMER COMPOSITIONS

This invention relates to polymer compositions.

More specifically, this invention relates to a polymer composition comprising a thermoplastic polycarbonate and a terpolymer of recurring units of a monovinyl aromatic monomer, recurring units of a maleimide monomer and recurring units of an $\alpha, \beta$ ethylenically unsaturated cyclic anhydride monomer.

In one of its more specific aspects, this invention pertains to a polymer alloy comprising a thermoplastic polycarbonate and a terpolymer which contains not more than about 30 total weight percent of a maleimide monomer and, ethylenically unsaturated cyclic anhydride monomer with the balance being a monovinyl aromatic monomer.

The incompatibility of polymers with one another is well established. Coming up with a workable combination of polymers is still as much luck and art as it is science. In the past, the terms "polymer alloy" and "polymer blend" or "polyblend" were used interchangeably. Technically, however, and as used herein, the term "polymer alloy" means a combination of polymers which are fully compatible with one another. And, as used herein, the term "polyblend" means a combination of polymers which are partially compatible, that is, the polymers exhibit partial miscibility with each other.

This invention provides a workable combination of polymers, which polymers are at least partially compatible with one another. Moreover, when the amount of recurring units of maleimide monomer and $\alpha, \beta$ ethylenically unsaturated cyclic anhydride monomer in the terpolymer make up not more than about 30 total weight percent of the terpolymer, the polycarbonate and the terpolymer are fully compatible with one another thus forming, quite unexpectedly, a polymer alloy.

According to this invention there is provided a polymer composition comprising in weight percent, from about 1 to about 99 of a thermoplastic polycarbonate based on bis-(hydroxyaryl) alkanes and from about 99 to about 1 of a random terpolymer of recurring units of a monovinyl aromatic monomer, recurring units of a maleimide monomer and recurring units of an $\alpha, \beta$ ethylenically unsaturated cyclic anhydride monomer.

In one embodiment, the polymer composition of this invention is a polymer alloy and the random terpolymer contains, in weight percent, from about 70 to about 90 recurring units of a monovinyl aromatic monomer, from about 2 to about 24 recurring units of a maleimide monomer and from about 2 to about 24 recurring units of an $\alpha, \beta$ ethylenically unsaturated cyclic anhydride monomer.

Polycarbonates suitable to produce the polymer compositions of this invention are homopolycarbonates based on bisphenols having the following general formula:

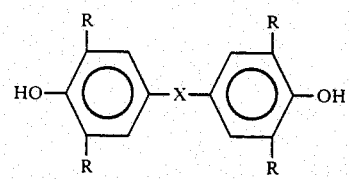

wherein each R separately represents hydrogen, a $C_1$ to $C_4$ alkyl group, chlorine, or bromine and wherein X represents a direct bond $C_1$ to $C_8$ alkylene.

Polycarbonates having the above general formula include: 2,2-bis-(4-hydroxyphenyl)-propane; 2,2-bis-(3-chloro-4-hydroxyphenyl)-propane, 2,2-bis-(3,5-dimethyl-4-hydroxyphenyl)propane; 2,4-bis-(3,5-dimethyl-4-hydroxylphenyl)-2-methylbutane. Particularly suitable for use in the practice of this invention is 2,2-bis-(4-hydroxyphenyl)-propane.

The terpolymers suitable for use in this invention are random terpolymers having peak number average molecular weights within the range of from about 50,000 to about 300,000, preferably 150,000 to about 250,000. They can be prepared by a free radical polymerization in solution, or in bulk and will comprise from about 40 to about 96 weight percent monovinyl aromatic monomer, from about 2 to about 58 weight percent maleimide monomer and from about 2 to about 40 weight percent $\alpha, \beta$ ethylenically unsaturated cyclic anhydride monomer. Preferably, the terpolymers will be prepared by continuous bulk polymerization.

If a polymer alloy is desired, the terpolymer must be formulated to comprise from about 70 to about 90 weight percent monovinyl aromatic monomer, from about 2 to about 24 weight percent maleimide, and from about 2 to about 24 weight percent $\alpha, \beta$ ethylenically unsaturated cyclic anhydride. Preferably, the terpolymers will be prepared by continuous bulk polymerization.

Any suitable monovinyl aromatic monomer can be employed to produce the terpolymer used in the compositions of this invention.

Suitable monovinyl aromatic monomers include styrene, alpha-methyl styrene, nuclear methyl styrenes, ethyl styrene, isopropyl styrene, tert butyl styrene, mono-, di-, and tribromostyrenes, mono-, di- and trichlorostyrenes, vinyl napthalene and the like and their mixtures. Styrene is the preferred monovinyl aromatic monomer.

Any suitable maleimide monomer can be employed to produce the terpolymers used in the compositions of this invention.

Suitable maleimide monomers will have the following general formula:

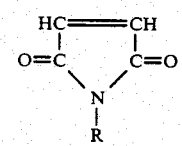

wherein R represents hydrogen, a $C_1$ to $C_4$ alkyl group, a halogen substituted $C_1$ to $C_4$ alkyl group, a phenyl group, a $C_1$ to $C_4$ alkyl substituted phenyl group or a mono-, di or trihalogen substituted phenyl group.

Suitable maleimides include maleimide, N-phenylmaleimide, N-ethylmaleimide, N-(2-chloropropyl) maleimide, N-(2-chloro-phenyl) maleimide, N-(3-chloro-phenyl) maleimide, N-(4-chloro-phenyl) maleimide, N-(4-bromo-phenyl) maleimide, N-(2,4,6-trichlorophenyl)maleimide, N-(2,4,6-tribromo-phenyl) maleimide, N-methylmaleimide, N-(4-methyl-phenyl) maleimide, N-(4-t-butyl-phenyl) maleimide, and the like and their mixtures. N-substituted maleimides are preferred and, N-phenylmaleimide is the preferred N-substituted maleimide.

Any suitable α, β ethylenically unsaturated cyclic anhydride can be employed to produce the terpolymer used in the compositions of this invention.

Suitable α, β ethylenically unsaturated cyclic anhydrides include maleic anhydride, citraconic anhydride, itaconic anhydride, aconitic anhydride, and the like and their mixtures. The preferred anhydride is maleic.

In a preferred embodiment of this invention, the terpolymer is a styrene/N-phenylmaleimide/maleic anhydride terpolymer.

To further enhance the impact strength properties of either the polyblends or the polymer alloys of this invention, the terpolymers can be chemically grafted to a rubber or mixture of rubbers during the synthesis of the terpolymer. As the rubber, use can be made of any conjugated diene homopolymer or copolymer with a styrenic monomer. The rubber contained in the resultant rubber-modified terpolymer will be present in an amount up to about 25 parts per 100 parts by weight of the terpolymer.

Methods for chemically grafting polymers to rubbers are well known. Following Example V teaches a method for the preparation of a styrene/N-phenyl maleimide/maleic anhydride terpolymer chemically grafted to a styrene/butadiene copolymer rubber using a continuous stirred tank reactor process.

The polymer compositions of this invention may be prepared using any suitable method of blending. Preferably, they are prepared by melt mixing at a temperature above the softening points of the polymers using any conventional high shear melt mixing apparatus, including twin screw extruders, single screw extruders, and the like. The extrudate can be chopped into pellets and molded using any conventional method of molding including: injection molding, roto-molding and the like. The word "molding" is meant to encompass all sheet and profile extrusion processes.

Having described the materials and methods of this invention, reference is now made to the following examples which serve to demonstrate the invention.

EXAMPLE I

This example demonstrates the preparation of a styrene/N-phenylmaleimide/maleic anhydride terpolymer containing a total of 28.1 weight percent N-phenylmaleimide and maleic anhydride, using a continuous stirred tank reactor process. The resulting terpolymer is suitable for use to produce polymer alloys of this invention.

Into a mixing vessel were added, with stirring, about 224 g of N-phenylmaleimide, about 224 g of maleic anhydride and about 2329.6 g of styrene.

The resulting solution was filtered to eliminate maleic acid and insoluble impurities.

To the filtered solution were added, with stirring, about 22.4 g of a polybutadiene rubber designated Diene ® 55 commercially available from Firestone Synthetic Rubber and Latex Co.; about 2.24 g of a mixture of alkylated aryl phosphites designated Polygard ® HR antioxidant commercially available from Uniroyal Chemical, division of Uniroyal, Inc., and about 2.2 g of benzoyl peroxide. Although optional, the addition of from about 0.5 to about 1 weight percent of a rubber e.g. Diene ® 55 polybutadiene, has been found to increase the solubility of the terpolymer in styrene.

The resulting solution was charged to the top of a continuous stirred tank reactor at a reaction temperature of about 90° C. and a reactor pressure of about 120 psi.

The polymerization product was withdrawn from the reactor bottom at a conversion of about 45 weight percent.

The polymerization product, a styrene/N-phenylmaleimide/maleic anhydride terpolymer, was diluted with styrene monomer, recovered by precipitation in methanol and dried.

The recovered terpolymer was analyzed and found to contain about 16.1 weight percent N-phenylmaleimide and about 12 weight percent maleic anhydride with the balance being styrene. The glass transition temperature of the terpolymer was found to be 154.5° C. as measured by differential scanning calorimetry (DSC).

EXMAPLE II

This example demonstrates the preparation of a styrene/N-phenylmaleimide/maleic anhydride terpolymer containing a total of 30.5 weight percent N-phenylmaleimide and maleic anhydride using a semi-batch process. The resulting terpolymer is suitable for use to produce polyblends of this invention.

A solution of about 124.4 g N-phenylmaleimide and about 1746 g of styrene was prepared and filtered to eliminate insoluble impurities. The resulting solution was then transferred into a one gallon stirred reactor and heated to 100° C. under a nitrogen atmosphere.

Into the closed reactor were charged about 1.8 g of Polygard ® HR antioxidant and about 0.5 g benzoyl peroxide to start the polymerization.

In a separate mixing vessel, a solution of about 166.6 g of maleic anhydride and about 760 g of styrene was previously prepared and filtered. The resulting solution was charged continuously to the one gallon reactor containing the polymerizing N-phenylmaleimide-styrene solution.

The continuous addition of the maleic anhydride-styrene solution took about 40 minutes after which the polymerization was terminated by adding about 0.49 g hydroquinone into the reactor.

The polymerization product, a styrene/N-phenylmaleimide/maleic anhydride terpolymer was diluted with styrene monomer, recovered by precipitation in methanol and dried.

The recovered terpolymer was analyzed and found to contain about 11.1 weight percent N-phenylmaleimide, about 19.4 weight percent maleic anhydride with the balance being styrene. The glass transition temperature of the terpolymer was found to be 163.5° C. (very narrow) by DSC.

EXAMPLE III

This example demonstrates the preparation of a styrene/N-phenylmaleimide/maleic anhydride terpolymer containing a total of 32 weight percent N-phenylmaleimide and maleic anhydride. The terpolymer is suitable for use to produce polyblends of this invention.

The same amounts of ingredients and substantially the same procedure of Example II was used.

The resulting terpolymer was analyzed and found to contain about 13.6 weight percent N-phenylmaleimide, and about 18.4 weight percent maleic anhydride with the balance being styrene. The glass transition temperature of the terpolymer was found to be 160° C. (narrow) by DSC.

EXAMPLE IV

This example demonstrates the preparation of a styrene/N-phenylmaleimide/maleic anhydride terpolymer containing a total of 40.8 weight percent N-phenylmaleimide and maleic anhydride using a batch process. The terpolymer is suitable for use to produce polyblends of this invention.

Into a mixing vessel were added, with stirring, about 224 g N-phenylmaleimide, about 156.8 g maleic anhydride and about 2396.8 g of styrene.

The resulting solution was filtered to eliminate maleic acid and insoluble impurities.

To the filtered solution were added, with stirring, about 2.4 g Diene ® 55 polybutadiene, about 2.2 g Polygard ® HR antioxidant and about 0.22 g benzoyl peroxide.

The resulting solution was charged to a one gallon reactor under a nitrogen atomosphere. The reactor temperature was heated to about 90° C. and the polymerization reaction was allowed to proceed for about 50 minutes. The polymerization reaction was terminated by the addition of about 0.5 g hydroquinone.

The polymerization product a styrene/N-phenylmaleimide/maleic anhydride terpolymer was diluted with styrene monomer, recovered by precipitation in methanol and dried.

The resulting terpolymer was analyzed and found to contain 24.7 weight percent N-phenylmaleimide and 16.1 weight percent maleic anhydride with the balance being styrene. The glass transition temperature of the terpolymer was found to be 191.5° C. (broad) by DSC.

EXAMPLE V

This example demonstrates the preparation of a styrene/N-phenylmaleimide/maleic anhydride terpolymer chemically grafted to a rubber using a continuous stirred tank reactor process.

Into a mixing vessel is added, with stirring, about 239.4 g of N-phenylmaleimide, about 138.6 g of maleic anhydride and about 2119.6 g of styrene.

The resulting solution is filtered to eliminate maleic acid and insoluble impurities.

To the filtered solution is added, with stirring, about 302.4 g of a butadiene-styrene copolymer rubber designated Stereon ® 720 Rubber commercially available from Firestone Synthetic Rubber and Latex Co. (Stereon ® 720 Rubber contains about 10 wt % bound styrene); about 2.5 g of a mixture of alkylated aryl phosphites designated Polygard ® HR antioxidant commercially available from Uniroyal Chemical, division of Uniroyal, Inc., and about 0.6 g of benzoyl peroxide.

The resulting solution is charged to the top of a continuous stirred tank reactor at a reaction temperature of about 100° C. and a reactor pressure of about 160 psi.

The polymerization product is withdrawn from the reactor botton at a conversion of about 45–50 weight percent.

The polymerization product, a styrene/N-phenylmaleimide/maleic anhydride terpolymer chemically grafted to rubber is diluted with styrene monomer, recovered by precipitation in methanol and dried.

EXAMPLE VI

This example demonstrates the preparation of a polymer alloy of this invention from polycarbonate and the styrene/N-phenylmaleimide/maleic anhydride terpolymer produced in Example I.

About 591.2 g of polycarbonate 2,2-bis(4-hydroxyphenyl) propane designated Merlon ® M-50 commercially available from Mobay Chemical Corporation were melt compounded at 480° F. with about 483.7 g of the styrene/N-phenylmaleimide/maleic anhydride terpolymer produced in Example I. Test specimens were injection molded for physical property testing. Table I below sets forth the property values obtained.

EXAMPLE VII

This example demonstrates the preparation of a polyblend of this invention from polycarbonate and the styrene/N-phenylmaleimide/maleic anhydride terpolymer produced in Example II.

About 789.5 g of Merlon ® M-50 polycarbonate were melt compounded at about 500° F. with about 646 g of the styrene/N-phenylmaleimide/maleic anhydride terpolymer produced in Example II. Test specimens were injection molded for physical property testing. Table I below sets forth the property values obtained.

EXAMPLE VIII

This example demonstrates the preparation of a polyblend of this invention from polycarbonate and the styrene/N-phenylmaleimide/maleic anhydride terpolymer produced in Example III.

About 783.7 g of Merlon ® M-50 polycarbonate were melt compounded at about 500° F. with about 522.5 g of the styrene/N-phenylmaleimide/maleic anhydride terpolymer produced in Example III. Test specimens were injection molded for physical property testing. Table I below sets forth the property values obtained.

EXAMPLE IX

This example demonstrates the preparation of a polyblend of this invention from polycarbonate and the styrene/N-phenylmaleimide/maleic anhydride terpolymer produced in

EXAMPLE IV

About 607 g of Merlon ® M-50 polycarbonate were melt compounded with 496.7 g of the styrene/N-phenylmaleimide/maleic anhydride terpolymer produced in Example IV. Test specimens were injection molded for physical property testing. Table I below sets forth the property values obtained.

TABLE I

Compatibility of Polymer Compositions Examples VI–IX

| | Polymer Composition (wt %) Terpolymer/Polycarbonate) | Total N—PMI and MA in Terpolymer (wt %) | Tg(°C.) by DSC | | | Compatibility of Polymers |
|---|---|---|---|---|---|---|
| | | | Terpolymer | Polycarbonate | Polymer Composition | |
| Example VI | 45/55 | 28.1 | 154.5 | 152.5 | 142.5 | fully compatible |
| Example VII | 45/55 | 30.5 | 163.5 | 152.5 | 142;171 | partially compatible |
| Example VIII | 40/60 | 32.0 | 160 | 152.5 | 146;173 | partially compatible |

TABLE I-continued

| | Polymer Composition (wt %) Terpolymer/Polycarbonate | Total N—PMI and MA in Terpolymer (wt %) | Tg(°C.) by DSC | | | Compatibility of Polymers |
|---|---|---|---|---|---|---|
| | | | Terpolymer | Polycarbonate | Polymer Composition | |
| Example IX | 45/55 | 40.8 | 191.5 | 152.5 | 148;195.5 | partially compatible |

It will be evident from the foregoing that various modifications can be made to this invention. Such, however, are considered to be within the scope of this invention.

What is claimed:

1. A polymer composition comprising in weight percent, from about 1 to about 99 of a thermoplastic polycarbonate based on bis-(hydroxyaryl) alkanes and from about 99 to about 1 of a random terpolymer of recurring units of a monovinyl aromatic monomer, recurring units of a maleimide monomer and recurring units of an α, β ethylenically unsaturated cyclic anhydride monomer.

2. The polymer composition of claim 1 in which said polycarbonate has the following general formula:

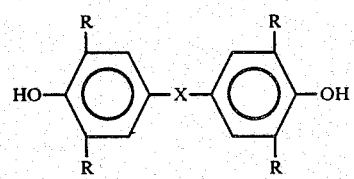

wherein each R separately represents hydrogen, a C₁ to C₄ alkyl group, chlorine or bromine and wherein X represents a direct C₁ to C₄ alkylene.

3. The polymer composition of claim 1 in which said maleimide monomer has the following general formula:

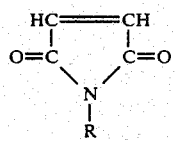

wherein R represents hydrogen, a C₁ to C₄ alkyl group, a halogen substituted C₁ to C₄ alkyl group, a phenyl group, a C₁ to C₄ alkyl substituted phenyl group or a mono-di or trihalogen substituted phenyl group.

4. The polymer composition of claim 1 in which said monovinyl aromatic monomer is styrene.

5. The polymer composition of claim 1 in which said maleimide monomer is N-phenylmaleimide.

6. The polymer composition of claim 1 in which said α, β ethylenically unsaturated cyclic anhydride is maleic anhydride.

7. The polymer composition of claim 1 in which said terpolymer is a styrene/N-phenylmaleimide/maleic anhydride terpolymer.

8. The polymer composition of claim 1 in which said terpolymer has a number average peak molecular weight within the range of from about 50,000 to aobut 300,000.

9. The polymer composition of claim 1 in which said terpolymer has a number average peak molecular weight of from about 150,000 to about 250,000.

10. The polymer composition of claim 1 in which said terpolymer is chemically grafted to a rubber.

11. The polymer composition of claim 1 in which said polycarbonate is 2,2-bis-(4-hydroxyphenyl)-propane.

12. A polymer alloy comprising in weight percent from about 1 to about 99 of a thermoplastic polycarbonate based on bis-(hydroxyaryl) alkanes and from about 99 to 1 of a random terpolymer of recurring units of a monovinyl aromatic monomer, recurring units of a maleimide and recurring units of an α, β ethylenically unsaturated cyclic anhydride, the polycarbonate and the random terpolymer being fully compatible with one another provided that the terpolymer comprises in weight percent from about 2 to about 24 N-substituted maleimide, from about 2 to about 24 α, β ethylenically unsaturated cyclic anhydride and from about 70 to about 90 monovinyl aromatic monomer.

13. The polymer alloy of claim 12 in which said polycarbonate has the following general formula:

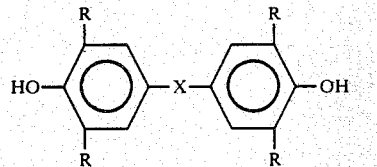

wherein each R separately represents hydrogen, a C₁ to C₄ alkyl group, chlorine or bromine and wherein X represents a direct C₁ to C₄ alkylene.

14. The polymer alloy of claim 12 in which said maleimide monomer has the following general formula:

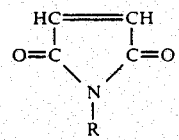

wherein R represents hydrogen, a C₁ to C₄ alkyl group, a halogen substituted C₁ to C₄ alkyl group, a phenyl group, a C₁ to C₄ alkyl substituted phenyl group or a mono-di or trihalogen substituted phenyl group.

15. The polymer alloy of claim 12 in which said monovinyl aromatic monomer is styrene.

16. The polymer alloy of claim 12 in which said maleimide is N-phenylmaleimide.

17. The polymer alloy of claim 12 in which said α, β ethylenically unsaturated cyclic anhydride is maleic anhydride.

18. The polymer alloy of claim 12 in which said terpolymer is a styrene/N-phenylmaleimide/maleic anhydride terpolymer.

19. The polymer alloy of claim 12 in which said terpolymer has a number average peak molecular weight within the range of from about 50,000 to aobut 300,000.

20. The polymer alloy of claim 12 in which said terpolymer has a number average peak molecular weight of from about 150,000 to about 250,000.

21. The polymer alloy of claim 12 in which said terpolymer is chemically grafted to a rubber.

22. The polymer alloy of claim 12 in which said polycarbonate is 2,2-bis-(4-hydroxyphenyl)-propane.

* * * * *